3,692,566
METHOD OF DEPOSITING ISOTROPIC BORON NITRIDE

Louis E. Branovich, Neptune, William B. P. Fitzpatrick, Wall, and Martin L. Long, Jr., West Belmar, N.J., assignors to the United States of America as represented by the Secretary of the Army
No Drawing. Filed Nov. 24, 1970, Ser. No. 92,519
Int. Cl. C23c 11/08
U.S. Cl. 117—106 R                    1 Claim

ABSTRACT OF THE DISCLOSURE

Chemical vapor deposited isotropic boron nitride is formed on the inner walls of a reaction chamber by forming a vapor mixture of an oxygen containing organic boron compound with ammonia and reacting the vapor mixture in said reaction chamber at about 1100 degrees C. to about 1900 degrees C. at pressures of about one torr to atmospheric.

The invention described herein may be manufactured, used, and licensed by or for the Government for governmental purposes without the payment to us of any royalty thereon.

BACKGROUND OF THE INVENTION

This invention relates to a method of chemically vapor depositing isotropic boron nitride on the inner walls of a reaction chamber.

It has been recognized that boron nitride is an insulator material having characteristics desirable for use in microelectronic applications, electron tubes, hybrid electronic devices, and as a structural support element in missile systems. The most desirable form of boron nitride that exhibits the above characteristics is the isotropic form in which there is no variation in characteristics with orientation. To date, the art has not disclosed a suitable method of making isotropic boron nitride.

In U.S. patent application, Ser. No. 821,466 for "Vapor Deposition Method," filed May 2, 1969 by Branovich, Fitzpatrick and Long, Jr. and assigned to the U.S. Government, of which this application is copending, there is disclosed and claimed a method of vapor depositing isotropic boron nitride from a deposit of anisotropic boron nitride. The latter method is satisfactory where one is interested in obtaining a thin layer of about 1 to 5 mils of isotropic boron nitride. However, the latter method is not satisfactory when one desires to obtain a relatively thick layer of isotropic boron nitride of about 10 to 1000 mils as for example, in insulator applications.

Accordingly, the general object of this invention is to provide a method of chemically vapor depositing isotropic boron nitride. A more specific object of this invention is to provide a method of depositing a relatively thick layer of about 10 to 1000 mils of chemical vapor deposited isotropic boron nitride.

SUMMARY OF THE INVENTION

Chemical vapor deposited isotropic boron nitride is formed on the inner walls of a reaction chamber by forming a vapor mixture of an oxygen containing organic boron compound with ammonia and reacting said vapor mixture in the reaction chamber at about 1100 degrees C. to about 1900 degrees C. at pressures of about one torr to atmospheric (760 millimeters of mercury).

DETAILED DESCRIPTION OF THE PREFERRED EMBODIMENT

Example 1

In this example, the oxygen containing organic boron compound is trimethoxyboroxole.

According to the method, nitrogen is first bubbled through the trimethoxyboroxole; the nitrogen vaporizing the trimethoxyboroxole and carrying it in vapor form into a pre-mixing chamber. Ammonia is then introduced into the pre-mixing chamber and the resulting vapor mixture passed into a graphite reaction chamber in the ratio of about 15 to about 25 moles of ammonia to about one mole of trimethoxyboroxole. The reaction chamber is maintained at a temperature of about 1650 degrees C. and under atmospheric pressure. Isotropic boron nitride forms on the inner wall of the graphite reaction chamber at a rate of about 15 mils per hour.

Example 2

In this example, the oxygen containing organic boron compound is 1,3,5-trimethoxyborazole formed from the reaction of one mole of borazole with three moles of methanol.

The method used is similar to that of Example 1 except that borazole and methanol are used in place of trimethoxyboroxole. Nitrogen is used to vaporize the borazole and methanol. The molar ratio of borazole to methanol to ammonia is about 1 to 3 to 8. The graphite reaction chamber is maintained at temperatures from 1500 degrees C. to 1800 degrees C. under a pressure of about 10 to 50 torr. Chemical vapor deposited isotropic boron nitride is formed on the inner walls of the reaction chamber at a rate of about 3 to 7 mils per hour.

Example 3

In this example, triethylborate is the oxygen containing organic boron compound.

The method used is as in Example 1 using triethylborate and ammonia in the mole ratio of about one mole of triethylborate to about 5 to 8 moles of ammonia. Nitrogen is again used to vaporize the triethylborate which is mixed with ammonia in the pre-mixing chamber. The graphite reaction chamber is maintained at about 1400 degrees C. to about 1750 degrees C. under a pressure from about 10 to 100 torr. Chemical vapor deposited isotropic boron nitride is formed on the inner walls of the reaction chamber at a rate of about 3 to 7 mils per hour.

The oxygen containing organic boron compounds used in the method are those that can react with ammonia at temperatures greater than 1100 degrees C. to form boron nitride, water and volatile compound(s). They can be grouped generally as boron oxide ($B_2O_3$). The reactions are reversible and can be written generally as:

$$B_2O_{3\,(gas)} + 2NH_{3\,(gas)} \rightleftarrows 2BN_{(solid)} + 3H_2O_{(gas)}$$

The reaction chamber used is made of a material having a coefficient of thermal expansion similar to that of boron nitride such as graphiate. The temperature range in the reaction chamber can be from as low as 1100 degrees C. to as high as 1900 degrees C. The pressure within the reaction chamber can be varied from less than one torr to as high as atmospheric (760 millimeters of mercury). The rate of deposition of isotropic boron nitride increases with increasing pressure. Morever, the molar concentration of ammonia and boron compound is always larger than unity.

The density of the resulting isotropic boron nitride is between 1.3 and 2.1 grams per cc. or approximately 60 to 93 percent of the theoretical density.

The method is noncontinuous, that is: the method can be operated on one day; the chemical reaction stopped, and then rerun on the following days without lamination between the new runs. Nitrogen is used in the method to vaporize the boron compound and carry it in vapor form to the pre-mixing chamber. In lieu of nitrogen, one may use another gas as the carrier such as an inert gas.

The method of the invention is believed to be explained as follows:

Since there is no deposit of boron nitride except on the inner walls of the hot reaction chamber, it is assumed that the reaction is surface activated and that no vapor phase nucleation takes place. This gives rise initially to orderly packed crystals. Since the reaction is reversible, the water generated in the chemical reaction can attack the initially deposited boron nitride creating "holes" or "voids." This could account for the variation in density of boron nitride as well as the isotropy of the boron nitride material. That is, the water attacking the underlying boron nitride creates holes and the detaching of crystals, which, in the presence of excess ammonia reattach in a random fashion giving rise to isotropic boron nitride. Some of the boron nitride crystals then reattach over a void space giving rise to low density boron nitride.

The variation in density of boron nitride may also be due to the amount of boron compound used. That is, assume the amount of boron compound used is reduced by a half. Then, the overall equation is:

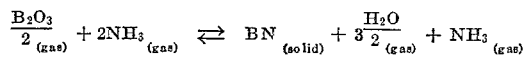

In this balanced equation, only 3/2 water is formed whereas in the previous equation 3 moles water are formed. With less water in the vapor phase, there is less water to attack the underlying boron nitride. Less voids or holes are produced, and the boron nitride material is more dense than the material produced when more water is generated. This has been demonstrated experimentally.

We wish it to be understood that we do not desire to be limited to the exact details of construction shown and described, for obvious modifications will occur to a person skilled in the art.

What is claimed is:

1. Method of forming chemical vapor deposited isotropic boron nitride on the inner walls of a reaction chamber including the steps of (A) forming a vapor mixture of 1,3,5-trimethoxyborazole with ammonia in the molar ratio of about 8 moles ammonia to about 1 mole of 1,3,5-trimethoxyborazole, and (B) reacting said vapor mixture in said reaction chamber at about 1500 to 1800 degrees C. under pressures of about 10 to 50 torr.

References Cited

FOREIGN PATENTS 1,539,247   9/1968   France _____ 117—106 A

RALPH S. KENDALL, Primary Examiner

U.S. Cl. X.R.

23—191; 117—Dig. 10